United States Patent
Murphree (10) Patent No.: US 7,898,198 B2
(45) Date of Patent: Mar. 1, 2011

(54) TORQUE CONTROLLER IN AN ELECTRIC MOTOR

(75) Inventor: Jerry Eony Murphree, Madison, AL (US)

(73) Assignee: DRS Test & Energy Management, LLC, Huntsville, AL (US)

( * ) Notice: Subject to any disclaimer, the term of this patent is extended or adjusted under 35 U.S.C. 154(b) by 1309 days.

(21) Appl. No.: 11/443,822

(22) Filed: May 31, 2006

(65) Prior Publication Data

US 2007/0001636 A1    Jan. 4, 2007

Related U.S. Application Data

(60) Provisional application No. 60/695,226, filed on Jun. 29, 2005.

(51) Int. Cl.
*H02P 7/00* (2006.01)
(52) U.S. Cl. .............................. 318/432; 318/434
(58) Field of Classification Search .............. 318/432, 318/434
See application file for complete search history.

(56) References Cited

U.S. PATENT DOCUMENTS

| | | | | |
|---|---|---|---|---|
| 5,028,852 A * | 7/1991 | Dunfield | ............... | 318/400.33 |
| 5,382,889 A * | 1/1995 | Peters et al. | ........... | 318/400.06 |
| 5,801,508 A * | 9/1998 | Obayashi | ................ | 318/801 |
| 5,803,197 A * | 9/1998 | Hara et al. | ................ | 180/248 |
| 5,880,574 A * | 3/1999 | Otsuka et al. | ............ | 318/811 |
| 6,023,140 A * | 2/2000 | Joo et al. | ............ | 318/400.16 |
| 6,469,469 B1 * | 10/2002 | Chambers et al. | ........... | 318/801 |
| 6,960,896 B1 * | 11/2005 | Shu et al. | ............ | 318/400.06 |

* cited by examiner

*Primary Examiner*—Bentsu Ro
*Assistant Examiner*—David S Luo
(74) *Attorney, Agent, or Firm*—SNR Denton US LLP (57) ABSTRACT

The torque of a motor operated by an inverter circuit is controlled to allow maximum torque in the motor when the motor is stalled or at low rotation speeds. Control is accomplished by providing a switching frequency to the motor at a first switching frequency, detecting a rotation speed of the motor, and switching the current to the motor to a second switching frequency when the rotation speed of the motor drops to a predetermined slow rotation speed. The second switching frequency is less than the first switching frequency.

50 Claims, 4 Drawing Sheets

TORQUE CONTROLLER IN AN ELECTRIC MOTOR

This application claims the benefit of filing priority under 35 U.S.C. §119 and 37 C.F.R. §1.78 of the U.S. Provisional Application Ser. No. 60/695,226 filed Jun. 29, 2005, for a Stall Torque Controller. All information disclosed in the prior pending provisional application is incorporated herein by reference.

FIELD OF THE INVENTION

The present invention relates generally to electric motors controlled by power electronics. More particularly, the present invention relates to a pulse width modulated controller and a method of controlling an electric motor.

BACKGROUND OF THE INVENTION

Electric motors may be controlled by a group of insulated gate bipolar transistors (IGBTs). The IGBTs regulate the flow of current to the stator. The stator is composed of stationary windings in the motor which generate a magnetic field when excited. Current flows through the IGBTs when the IGBTs close (i.e., form a closed circuit), which allows current to flow through the stator windings. The magnetic field generated by the current flowing in the stator interacts with the magnetic field in the rotor. The interaction of the magnetic fields produces a torque on the rotor. The torque generated is proportional to the current flowing in the IGBTs, when the angle between the magnetic fields is held constant. The angle between the magnetic fields is maintained by controlling the switch timing of the IGBTs. By accelerating the switch timing of the IGBTs, the rotor may be accelerated, thus controlling the speed of the motor.

There are two sources of heat in the IGBTs controlling the flow of current to the motor. The first source of heat is due to switching. Non-zero voltages and currents exist at the same time when the switch transitions between states. This voltage and current product produces heat. More heat is produced as the switching frequency increases, because there are more transitions each second. The other source of heat is due to conduction. An IGBT produces a small voltage drop when turned on. The product of the current flowing through the IGBT and the voltage drop across the IGBT is responsible for the heat. More heat is produced for longer periods of time the switch conducts current. Three-phase motors require a pair of switches for each phase. The switches are modulated such that peak currents are constantly shifted between the phases. Therefore, the current delivered to a motor is distributed between three IGBT pairs, so the losses in the form of heat are distributed between six IGBTs.

Before the motor spins, it is in a stationary state referred to as the stall condition. In order to cause rotation in the motor, a magnetic field must be generated in a specific location. The field location is determined by the rotor position. The field is constantly moving in a rotating motor. The field is stationary for a stationary rotor. A specific combination of the six IGBTs corresponds to the placement of the field. As the field spins, the combination of switching IGBTs constantly changes. For the stall condition, only two IGBTs are conducting, so the load is not shared between the other IGBTs. The IGBTs are limited in the amount of heat they can dissipate. Two switches at stall condition cannot dissipate the amount of heat six switches can dissipate while the motor spins. Therefore, under the same switching conditions, the two switches cannot deliver the same amount of current to the motor at stall as the six switches can provide during rotation, thus limiting the stall torque.

Methods have been implemented to avoid failure due to overheating. The first method involves derating the torque at stall. Derating the torque implies lowering the maximum available torque. Because torque is proportional to current, lowering the torque results in a smaller maximum current passing through the conducting IGBTs at stall. The amount of heat produced in an IGBT is proportional to the amount of current passing through the IGBT. Thus, lower current produces less heat, keeping the IGBT within the rated operating capabilities, and failure is avoided. However, because the current is reduced, the torque at stall is reduced, and the full operational range is handicapped based on the nature of the stall condition. Electric drives are specified based on a maximum torque. The maximum torque is needed at stall just as it is needed at the other speeds for which the maximum torque is rated.

A second method to avoid overheating at stall involves duty cycle limiting. The full torque may be applied for some small time period, then a limited torque is applied in a "rest" period. The limited torque requires less current. Less heat is produced during the "rest" period, and the heat generated from the higher current at higher torque is given time to be removed. The result is a series of torque pulses at stall. Overheating can be avoided, but two other problems arise. Torque pulsations may cause damage to mechanical components. In addition, in order to accelerate a load, a specific torque must be held for some minimum time. If the torque pulse time does not meet the minimum time to accelerate the load, the rotor will not begin to spin.

SUMMARY OF THE INVENTION

An apparatus and method for controlling the torque of a motor by providing a switching frequency to the motor at a first switching frequency, detecting a rotation speed of the motor, and adjusting the current to the motor to a second switching frequency when the rotation speed of the motor reaches a predetermined rotation speed.

DETAILED DESCRIPTION OF THE INVENTION

Figure 1:
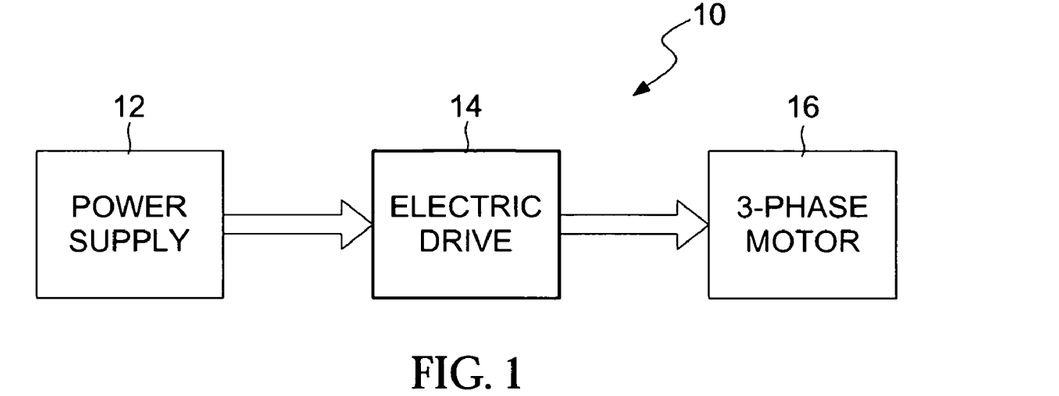
FIG. 1 is a block diagram of a motor system.

Referring to the drawings for a better understanding of the function and structure of the invention, FIG. 1 shows a block diagram of a motor system 10. The motor system 10 includes a power supply 12, an electric drive 14, and a 3-phase motor 16. The power supply 12 provides power to the motor 16. The power supply is preferably a direct current power source. An AC source with a rectifier may also be used to provide power to the electric drive 14. The electric drive 14 controls the power from the power supply 12 to the 3-phase motor 16. As further described below, the electric drive 14 modulates the power and provides the power according to the control design of the electric drive 14 to the 3-phase motor 16. In this manner, the electric drive 14 may control variables such as the speed and torque of the 3-phase motor 16. The electric drive 14 may also receive speed and torque feedback from the 3-phase motor 16 and also receive speed and torque input from a user wishing to control the 3-phase motor 16.

Figure 2:
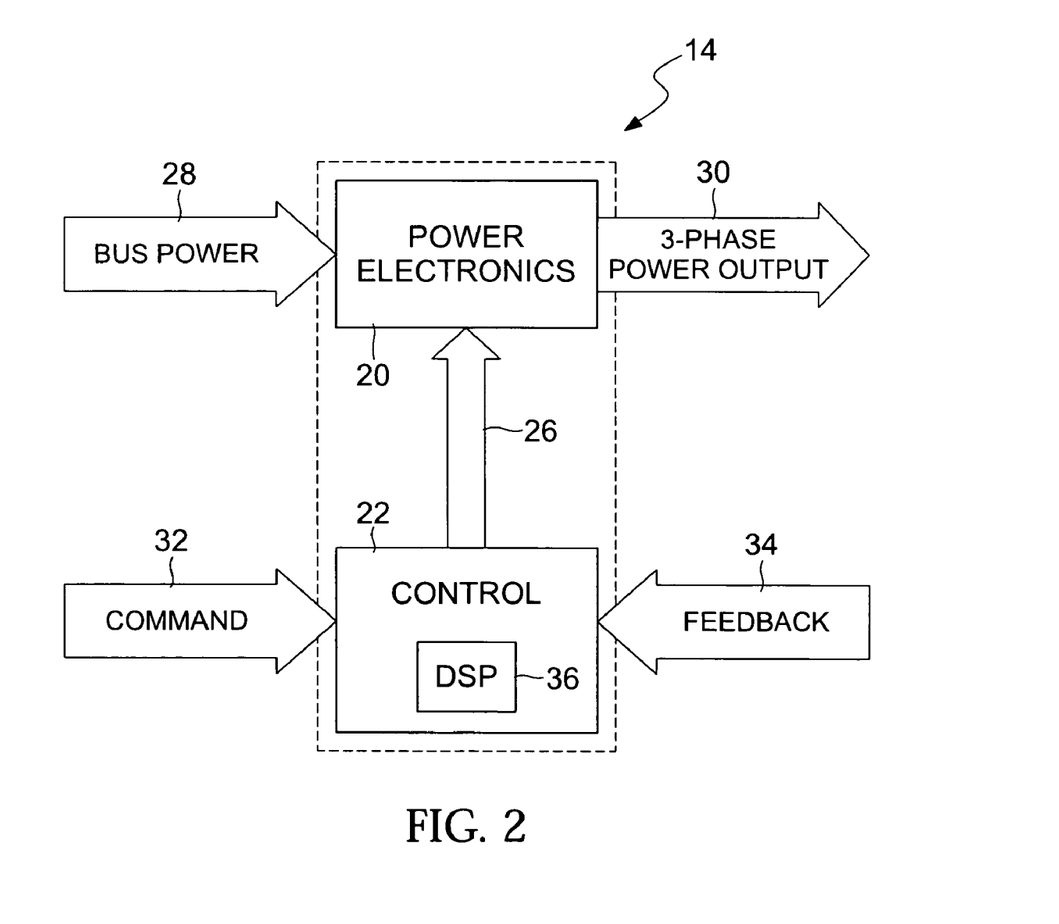
FIG. 2 is a block diagram of an electric drive for the motor system of FIG. 1.

Referring now to FIG. 2, FIG. 2 shows a block diagram of the electric drive 14 for the motor system of FIG. 1. The electric drive 14 includes power electronics 20 and a control module 22. The control module 22 sends a control signal 26 to the power electronics 20. The power electronics 20 modulates a bus power signal 28 using the control signal 26 to send a 3-phase power output signal 30 to the 3-phase motor 16 of FIG. 1. The control module 22 uses an input command signal 32 from a user and feedback 34 from the 3 phase motor 16 of FIG. 1 to calculate the control signal 26.

In operation, the electric drive 14 powers the motor 16 and measures the output of the motor 16 in order to control the speed and torque of the motor 16. In one embodiment, the control module 22 includes a digital signal processor (DSP) 36. The DSP 36 reads the feedback signal 34 from the motor 16 and converts the feedback signal 34 into a digital signal that may be processed in the DSP 36. The DSP 36 analyzes the feedback signal 34 and the command signal 32 to output the control signal 26 to the power electronics 20. While the DSP 36 may perform all the analog to digital functions and processing functions in the control module 22, other signal processing devices such as a state machine held in firmware, EEProm, PHL, etc. may perform the analog to digital functions and processing functions in the control module 22. The control signal 26 is a series of pulse width modulated switching signals for the power electronics 20. As will be more fully understood below, the control signal includes six signal lines to the power electronics 20, one line for each IGBT in the power electronics 20. Thus, the control module 22 takes the feedback signal 34 and command signal 32 as input through a digital signal processor 36 and generates a control signal 26 for the power electronics 20 to control the torque and speed of the motor 16.

The control signal 26 is a series of pulse width modulated switching signals. These signals, as described below, are used to drive the gates of the IGBTs in the power electronics 20 using small currents to drive the gates of the IGBTs open and close. The pulse width of these signals, when the motor is running at full speed, are determined based upon characteristics of the device. For example, the switching frequency may be set at a frequency above the audible range for humans. Generally, this frequency is about 20 kHz. Another reason for setting the pulse width frequency high is to limit the number of harmonics that would be created in the electronics and the motor. Higher switching frequencies decreases the number of harmonics, which in turn reduces losses in the electronics. As described below, by controlling losses in the electronics, the power electronics 20 of the electric drive 14 may be maintained with less damage.

The bus power signal 28 provides the power for the 3-phase motor 16. The bus power signal 28 is a high current, DC voltage signal that is passed through the electronics 20 to produce the 3-phase power output signal 30. Because the control signal 26 controls gates in the IGBTs of the power electronics 20, the power electronics 20 drives the 3-phase power output signal 30 by passing the bus power signal 28 through the IGBTs to the coils of the 3-phase motor 16.

The feedback signal 34 from the motor 16 may include rotor position, speed, and torque from the motor 16. The torque may be sensed using a torque sensor on the motor. The position may be sensed by Hall effect sensors or back-emf from the windings. The speed may be calculated from the position information by differentiating the position signal with respect to time.

Figure 3:
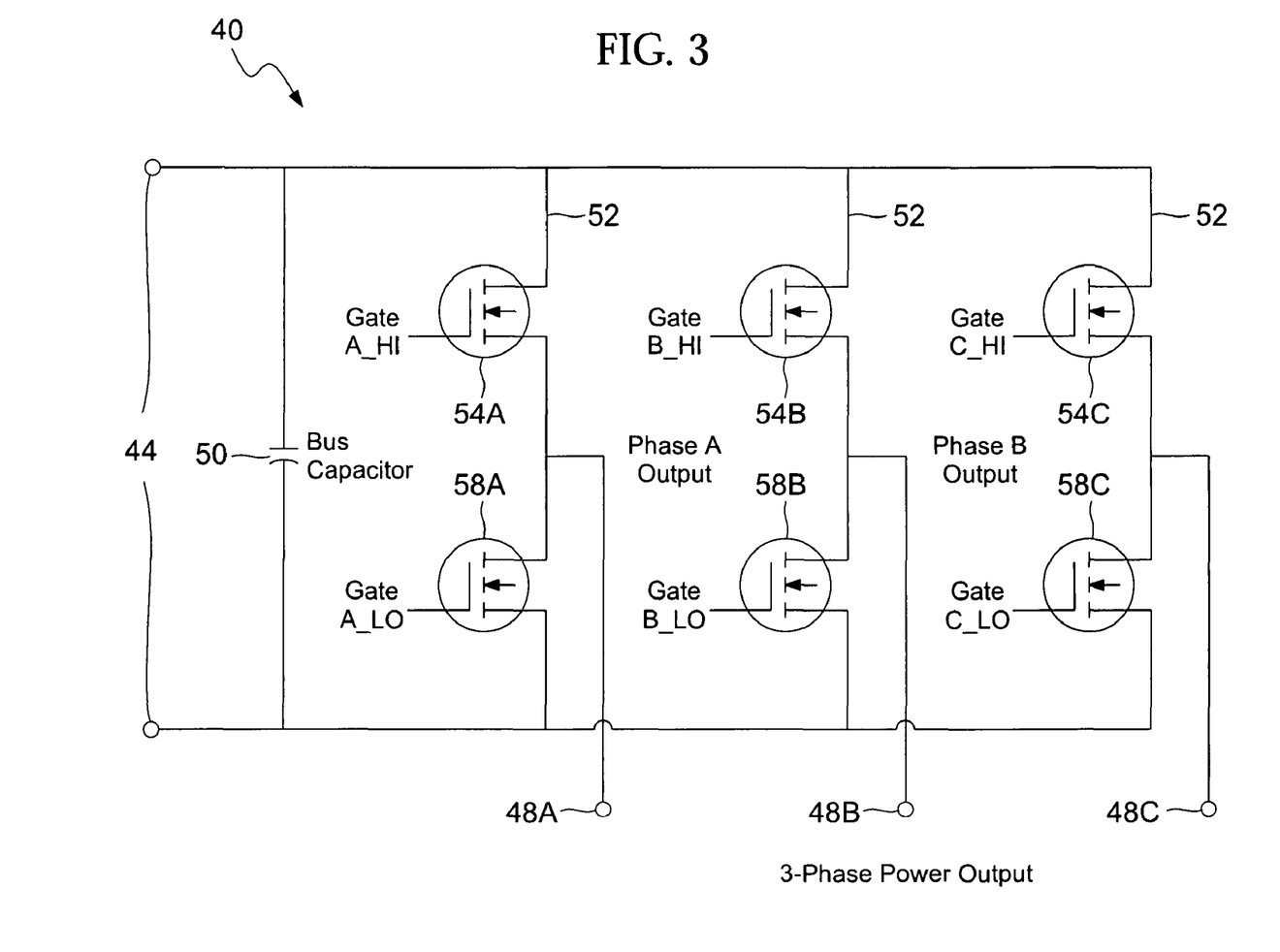
FIG. 3 is a diagram of an inverter circuit located in the power electronics block of FIG. 2.

Referring now to FIG. 3, FIG. 3 is a diagram of an inverter circuit 40 located in the power electronics block of FIG. 2. The inverter circuit 40 includes bus power terminals 44 for passing a power signal to the inverter circuit 40. Three power out terminals 48A-C provide power to the motor 16. A bus capacitor 50 is connected in series between the bus power terminals 44. Parallel to the bus capacitor 50, three parallel legs 52 include pairs of IGBTs 54A-C and 58A-C connected in series between the bus power terminals 44. Within each pair of IGBTs 54A-C and 58A-C on the three parallel legs 52 of the circuit 40, one of the power out terminals 48A-C is connected between a high IGBT 54A-C and a low IGBT 58A-C.

In operation, the gates of the IGBTs are closed in pairs. One high IGBT 54A-C is closed at the same time as a low IGBT 58A-C. The pairing, though, includes one high IGBT 54A-C paired with a low IGBT 58A-C from a parallel leg 52 of the inverter circuit 40. For example, when high IGBT 54A is closed, then low IGBT 54B or 54C may also be closed. Whether low IGBT 54B or 54C is closed depends on the desired direction of rotation of the shaft.

When the IGBT gates 54A-C and 58A-C are closed, current from the bus power terminals 44 flows through the closed IGBTs 54A-C and 58A-C to the power out terminals 48A-C. Because one high IGBT 54A-C is closed at the same time as one low IGBT 58A-C, one power out terminal 48A-C that is electrically connected to the leg 52 on which the high IGBT 54A-C is closed is the high output signal while the power out terminal 48A-C that is electrically connected to the leg 52 on which the low IGBT 58A-C is closed is the low output signal.

The current flows from the power out terminal 48A-C to a winding on the motor. The high signal creates a positive magnetic charge in a winding and pulls the negative end of the magnet attached to the rotor (the armature) toward alignment with that winding. The low signal flows through a winding located opposite the first winding and creates a negative magnetic charge which pulls the positive end of the armature toward alignment with this opposite winding. Together, the high and low signals on the power out terminals 48A-C rotate the rotor ⅙ a rotation, or 60°. Once the rotor has rotated, a different pair of IGBTs are closed in the inverter circuit 40 corresponding to the windings adjacent to the windings that were electrified in the stator. The speed at which the rotor rotates determines how long the PWM switching signal 26 from the control module 22 is sent for any one IGBT. As the speed of the rotor increases the length of time the PWM signal 26 switches any one IGBT is decreased. As the speed of the rotor decreases, the length of time the PWM signal 26 switches any one IGBT is increased. However, because the rotor speed is approximately constant during any one rotation, the percentage of the time during a rotation that any one IGBT is switching on and off is constant.

For example, when the rotor spins at 1000 rotations per minute (RPM) and the PWM signal 26 switches at 20 kHz (i.e., 20,000 cycles per second), each IGBT will switch 400 times during each rotation (⅓ of the total cycles in a rotation, or ⅓ of 1200 cycles.) At 500 RPM and switching at 20 kHz, each IGBT will switch 800 times in a cycle, but the total number of cycles per rotation is 2400 cycles. Thus, regardless of the speed, each IGBT will switch for ⅓ of the time it takes to make a rotation. As the rotation slows further, the number of cycles per IGBT increases and the time (although not the percentage of time for a rotation) that one IGBT continuously switches also goes up.

In the most drastic situation, where there is no rotation, only two IGBTs will switch current because the rotor is not turning and no other IGBTs switch. In order to maintain the torque produced in the motor, the IGBTs must continue to switch the same current through the IGBT (because torque is proportional to current) and must continue to do so for an indefinite time period. Thus, one pair of IGBTs perform all the switching for the motor and may burn out as the continuous switching builds heat to a level where the IGBTs fail. By adjusting the switching frequency, however, the heat may be managed and controlled to avoid this failure.

Heat, which causes failure in the IGBTs, is generated each cycle the IGBT switches. When the IGBT is not switching the current, the IGBT dissipates heat. Because at lower rotation speeds, the IGBTs experience more cycles consecutively, the IGBTs heat up more when they are switching, but they have a longer period of time to dissipate the heat. At lower speeds, the majority of heat built up in the IGBTs is caused by the switching in the IGBTs. By changing the number of times the IGBTs switch, the heat build up may be minimized. However, additional heat from other sources, such as harmonics may increase. These additional sources of heat do not account for as much heat as the heat generated from the switching, and thus is preferred over the heat caused by the high switching frequency.

The control module 22 of FIG. 2 limits the buildup of heat in the IGBT by adjusting the switching frequency which adjusts the number of cycles each IGBT switches during a rotation. The current that passes through the IGBT may remain at the rated current, and may remain on at all times. Thus, the torque at the motor may remain constant and may remain at the maximum torque for the motor without losing any of the IGBTs. As will be described with reference to FIGS. 4 and 5, the control module 22 uses the feedback signal 34 and the command signal 32 to generate the control signal 26 adjusted according to the speed of rotation of the motor.

Figure 4:
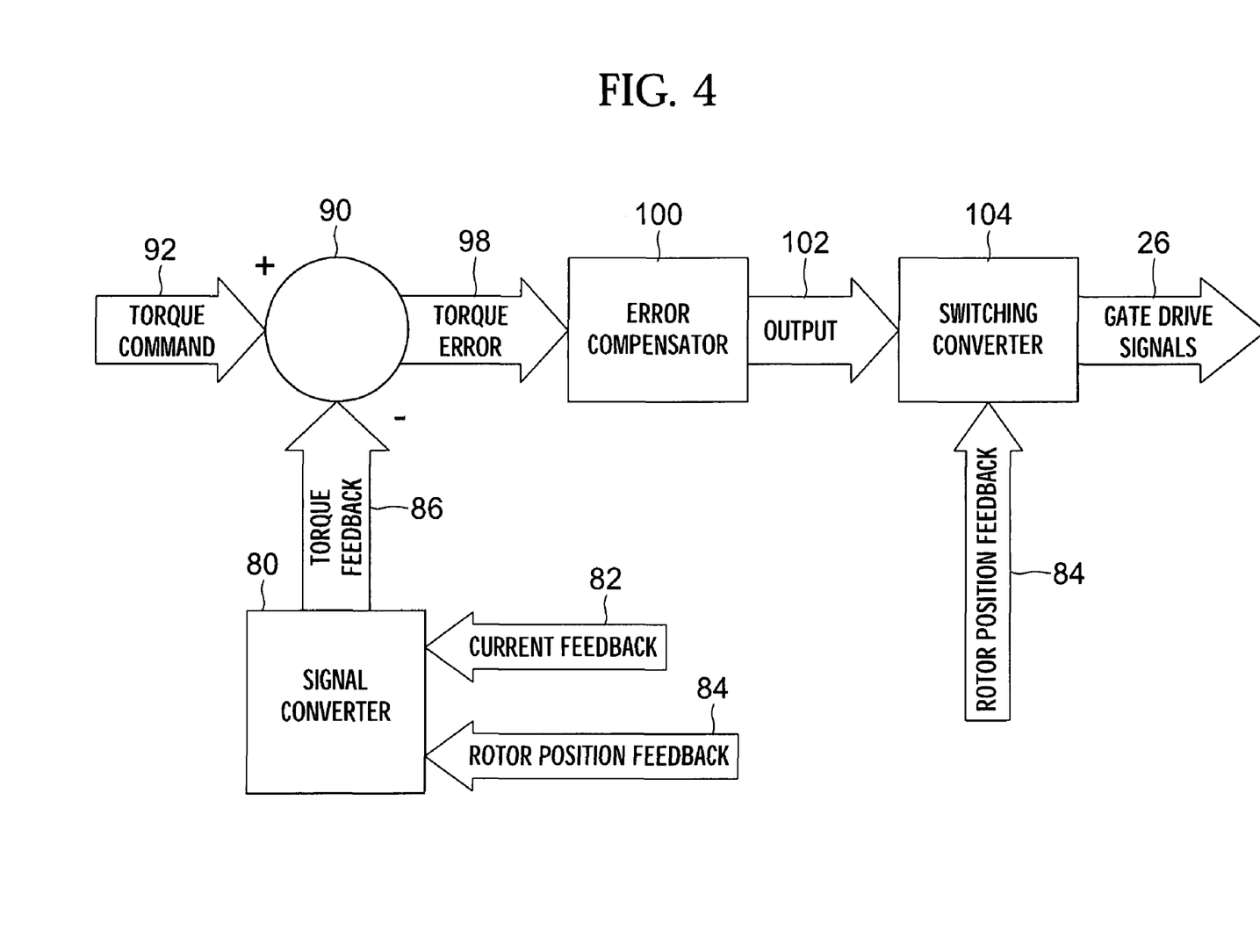
FIG. 4 is a flow diagram of operations of the control block of FIG. 2.

Referring now to FIG. 4, FIG. 4 is a flow diagram of operations of the control block of FIG. 2. The process occurs in the DSP block 36 of the control module 22. A signal converter 80 converts analog current and position signals 82 and 84 from the motor 16 into a digital torque feedback signal 86. A summing block 90 compares the torque feedback signal 86 to a torque command signal 92, which is generated from the user command signal 32 of FIG. 2. The summing block 90 outputs a torque error signal 98. An error compensator 100 calculates the gain necessary to adjust the torque output at the motor given the torque error signal 98. The error compensator 100 outputs an output signal 102 into a switching converter 104. The switching converter 104 modulates the pulse width of the output signal 102 and outputs a gate drive signal, which is the control signal 26 of FIG. 2. The switching converter 104 adjusts the pulse width of the output signal 102 according to information received from the rotor position feedback signal 84.

The signal converter 80, which is preferably part of the digital signal processor 36 of FIG. 2, digitizes feedback from the motor 16 and calculates the torque feedback signal 86. The current feedback 82 is a signal generated in the windings from the back electromotive force of the armature of the rotor as it rotates. The rotor position feedback signal 84 measures the rotor position, and when differentiated with respect to time, determines the speed of rotation of the motor 16. Using the current feedback signal 82 from the windings and the rotor position signal to measure angles between the armature and the windings and the speed of the armature (which is the same as the speed of the rotor), the signal converter 80 calculates the torque of the motor. This torque feedback signal 86 is summed in the summing block 90.

The summing block 90 calculates the difference between the torque command 92 and the torque feedback 86. The torque command 92 is the amount of torque desired by the user, and is input through the command signal 32. The difference between the torque command 92, which represents the desired torque, and the torque feedback 86, which represents the actual torque, is the torque error 98. Thus, the torque error 98 represents the additional amount of torque desired from the motor 16. The error compensator 100 is configured to calculate the necessary current command to generate the torque.

The error compensator 100 calculates the gain for the torque error signal 98. The output signal 102 from the error compensator 100 sets the amplitude of the gate drive signals 26. The error compensator 100 determines which IGBTs will be closed, and the timing between gate drive signals 26 for different IGBTs. The error compensator 100 also calculates the dynamic response of the motor 16 given the rotor position, speed and torque characteristics to calculate the response of the motor 16. As the speed and torque change, the dynamics will change. The gain of the error compensator 100 adjusts to these changes to maximize performance and stabilize the system. The error compensator 102 also adjusts to time delays in the system based upon the speed of the rotor. As the rotor slows, the time between iterations within the control loop may lengthen. The error compensator 100 may adjust the time delay between iterations to account for slower rotation speeds. After the output signal 102 has been calculated to adjust the torque requirement into a gate drive signal, the switching converter 104 modulates the pulse width of the output signal 102.

The switching converter 104 modulates the output signal 102 into a pulse width modulated switching signal 26 at one frequency. As previously described, the PWM signal 26 is set at 20 kHz at normal operating conditions. When the rotor speed decreases, as determined from the rotor position feedback signal 84, then the switching frequency is adjusted to lower frequencies, which reduces the number of cycles each IGBT switches during a rotation. In one embodiment, the switching converter 104 may use 3 different switching frequencies depending on the speed of rotation. At low speed and stall a low switching frequency would be used. In a transition speed between low and high speeds, a middle switching frequency is employed, and at high speeds and maximum speed the high switching frequency would be used.

More particularly, and as an example, the switching converter 104 may switch the output signal 102 at 5 kHz at stall and at low frequencies up to 500 RPM. At 500 RPM, the switching converter 104 may switch the output signal 102 at 10 kHz. At 800 RPM, the switching converter 104 may switch the output signal 102 at 20 kHz. The 20 kHz signal would be the maximum switching frequency for the switching converter 104 and would continue to switch the output signal 102 at the maximum switching frequency at higher speeds. Thus, as the motor speeds up form stall, the switching frequency has transition speeds at 500 and 800 RPM where the switching frequency transitions from lower frequencies to higher frequencies.

When the motor slows down, the transition speeds may be at lower RPMs than the transition frequencies during increased speeds. For example, as the motor slows, the transition from 20 kHz to 10 kHz may occur at 700 RPM instead of 800 RPM, and the transition from 10 kHz to 5 kHz may occur at 400 RPM instead of 500 RPM. By adjusting the transition speeds in this manner, a hysteresis is created in the switching converter 104 so that the switching converter 104 does not create a chatter in the system. For example, if there was no hysteresis, the transition from 5 kHz to 10 kHz may be set at 500 RPM and the transition from 10 kHz to 5 kHz may also be set at 500 RPM. Then, as the motor increased in speed from 499 RPM to 501 RPM, the switching converter 104 would transition from a switching frequency of 5 kHz to 10 kHz. If the motor then slows down slightly, from 501 RPM back to 499 RPM, the switching converter 104 would transition from a switching frequency of 10 kHz to 5 kHz. Thus, as the motor varies slightly around the transition point, the switching converter 104 would chatter between the switching frequencies. However, when the hysteresis is added to the system, then the switching converter 104 does not adjust the frequencies as at the same speed when the motor increases velocity and decreases velocity. Thus, the motor is less likely to chatter at an almost constant velocity near a transition speed. While this stairstep example implements a method involving three different switching frequencies it is possible to include two or more different switching frequencies. Thus, with more than three switching frequencies, smaller differences in speed of rotation are matched to smaller differences in switching frequency.

Another method of adjusting the switching frequency of the switching converter 104 is to vary the switching frequency linearly with respect to the speed of the motor. In this manner, a small change in speed of the motor would create a small adjustment in the switching frequency. An offset frequency, b, equal to the minimum switching frequency, sets the minimum switching frequency. A scaling factor, k, which would be equal to the quotient of the difference between maximum and minimum frequency divided by the difference between the maximum and minimum speeds, scales the change in switching frequency based on a change in speed. Analytically, this relationship is expressed as:

$$f_2 = k * v_{cur} + b$$
$$k = \frac{f_{max} - f_{min}}{v_{max} - v_{min}}$$

where $f_2$=second switching frequency;
$v_{cur}$=current rotation speed of the motor;
b=linear offset frequency equal to minimum switching frequency;
$f_{max}$=maximum switching frequency;
$f_{min}$=minimum switching frequency;
$v_{max}$=maximum rotation speed of the motor; and
$v_{min}$=minimum rotation speed of the motor.

For example, a motor that runs between 0 and 1000 RPM, and a switching frequency between 5 kHz and 20 kHz, the value for the scaling factor is 15 Hz/RPM. At a speed of 500 RPM, the switching frequency would be 12.5 kHz (15 Hz/RPM*500 RPM+5 kHz). At stall, the switching frequency is the minimum frequency 5 kHz (15 Hz/RPM*0 RPM+5 kHz), and at full speed, the switching frequency is the maximum switching frequency, 20 kHz (15 Hz/RPM*1000 RPM+5 kHz).

Another method for adjusting the switching frequency depends on the torque requirement. If less than the maximum torque is required, then it is possible to maintain a higher switching frequency and producing less torque with less current. The minimum torque that would be produced would be the derated torque of the motor. At the derated torque, the IGBTs will not overheat at the maximum switching frequency. As the demand for torque increases above the derated torque, the switching frequency decreases. At maximum torque, the switching frequency will be reduced to a switching frequency that will still maintain the integrity of the IGBTs.

Adjusting the switching frequency according to torque requirements may be accomplished by either the stairstep method or the linear relationship method described above. The linear relationship between torque and switching frequency is given by the following set of equations:

$$f_2 = b - k * (T_{req} - T_{drt})$$
$$k = \frac{f_{max} - f_{min}}{T_{max} - T_{drt}}$$

where $f_2$=second switching frequency;
b=linear offset equal to the maximum switching frequency of the motor
$T_{req}$=current torque requirement of the motor;
$T_{drt}$=derated torque of the motor;
$T_{max}$=maximum torque requirement of the motor;
$f_{max}$=maximum switching frequency; and
$f_{min}$=minimum switching frequency.

Adjusting the frequency according to the torque requirement minimizes heat in the system by keeping the higher switching frequency when torque requirements are low. This minimizes loss due to higher order harmonics. Because this method adjusts switching frequency as a function of the torque requirements, it may be necessary to adjust the gain in the error compensator 102. The different method may require different gains to maintain the stability of the system than a system with the speed-based controller for switching frequency. However, regardless of the method used to determine switching frequency, the gain in the error compensator 100 may require adjustment over a similar system that does not adjust the switching frequency.

The methods that adjust the switching frequency in the switching converter 104 may include other logical algorithms such as a fuzzy logic controller, a neural network controller, combinations of these controllers, or other I/O algorithms. In implementing the different controller algorithms, criteria such as stability, chatter, ripple, efficiency and noise should be considered. It is preferred that the algorithm be robust enough to provide maximum torque at the rated speed. The algorithm should also account for heat generation so that the total amount of heat in the system does not grow to a level that damages the electronics. Generally, whether the switching frequency is modulated may be determined by a change in speed of the motor. The magnitude of the modulation in the switching frequency may be determined by the control algorithm. The signals, such as the torque, speed and command signals, may be used individually or in combination to determine the amount of modulation in the switching frequency.

Figure 5:
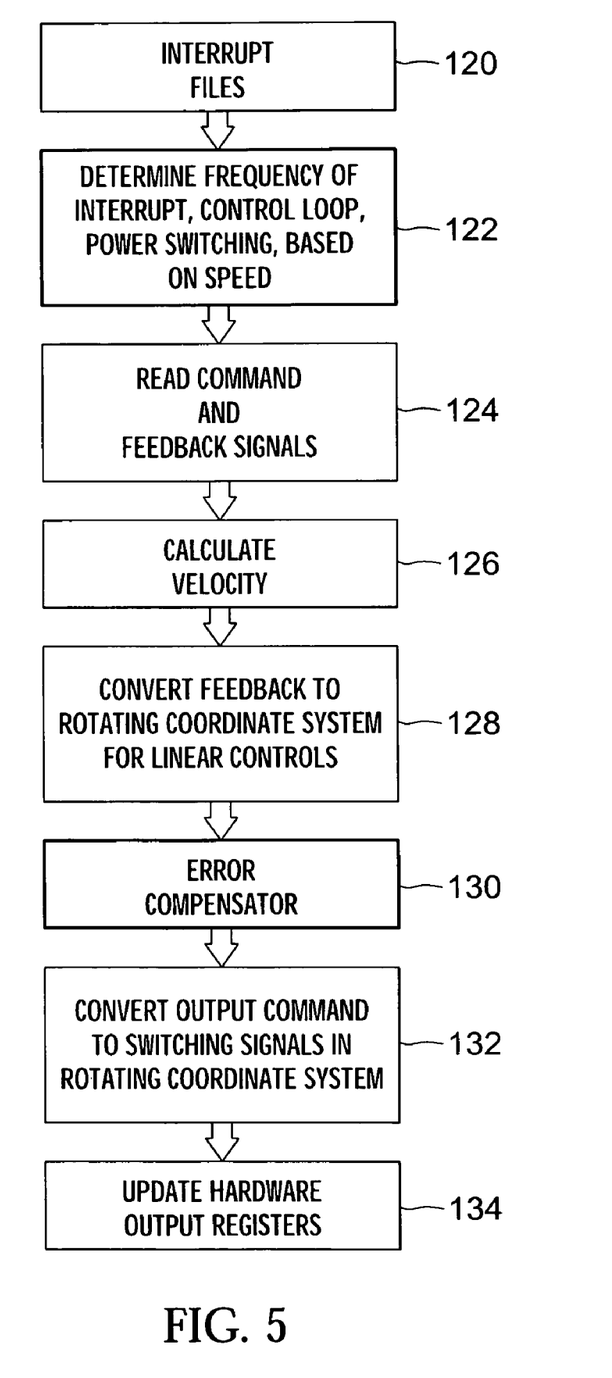
FIG. 5 is another flow diagram of other operations of the control block of FIG. 2.

Referring now to FIG. 5, FIG. 5 is another flow diagram of other operations of the control block 22 of FIG. 2. The control begins at interrupt block 120 where interrupts fire. A determining block 122 determines whether the interrupts are being received at a frequency corresponding to a low speed. A sensing block 124 reads the command and feedback signals. From the feedback signals, the velocity is calculated in block 126. A polar converter 128 converts the velocity into rotating coordinates for the linear controls. The error compensator block 130 performs the calculations necessary for the error compensator 100 to generate the control signals for the IGBTs. The control signals are transformed into the rotating coordinate system of the motor in block 132. Once all the calculations are made, an update block 134 updates the registers for the hardware with the new values for the switching converter 104 and error compensator 100 of FIG. 4.

The blocks of FIG. 5 calculate two types of data. The first is timing data. This set of data includes timing of the control loop and determining switching frequency. These calculations are based on the speed of the rotor. By measuring the speed of rotation and determining whether that speed is below a threshold, the switching converter 104 determines whether the switching frequency should be modulated. Then, based upon the speed of the rotor, the switching frequency is changed. Iterations in the control loop may also be adjusted when the rotation speed decreases.

The second type of calculation is the calculations in the error compensator 100 which controls the gain. As the speed of rotation changes, the gain in the error compensator 100 may be adjusted to make the system more stable. The error compensator 100 may also be adjusted to increase the performance at different rotation speeds. Moreover, gains may also be adjusted according to the method for modulating the switching frequency. When the switching frequency is modulated based on the speed of rotation, the gain may be different than when the switching frequency is modulated based on the torque. Again, the differences in the gains may be made for purposes of stability.

While the invention has been shown in embodiments described herein, it will be obvious to those skilled in the art that the invention is not so limited but may be modified with various changes that are still within the spirit of the invention.

Having set forth the nature of the invention, what is claimed is:

1. A method of controlling the efficiency of power electronics driving a motor, comprising:
   switching a voltage within said power electronics at a first fundamental frequency;
   providing a high frequency pulse width modulated component within said first fundamental frequency, said high frequency component have a frequency greater than said fundamental frequency;
   detecting a rotation speed of said motor; and
   responsive to said rotation speed, altering said frequency of said high frequency pulse width modulated component from a first switching frequency to a second switching frequency to control efficiency in said power electronics, said altering including determining said second frequency by the equation:

$$f_2 = k * v_{cur} + b$$
$$k = \frac{f_{max} - f_{min}}{v_{max} - v_{min}}$$

wherein $f_2$=said second switching frequency; $v_{cur}$=rotation speed of said motor b=a linear offset frequency equal to a minimum switching frequency; $f_{max}$=a maximum switching frequency; $f_{min}$=a minimum switching frequency; $v_{max}$=a maximum rotation speed for said motor; and $v_{min}$=a minimum rotation speed of said motor.

2. The method of claim 1, wherein said rotation speed is a stall condition.

3. The method of claim 1, wherein said first switching frequency comprises 20 kHz and said altering said frequency of said high frequency pulse width modulated component comprises reducing said first switching frequency to a second switching frequency of 5 kHz.

4. The method of claim 1, wherein said switching a voltage in said power electronics produces maximum torque in said motor.

5. The method of claim 1, wherein said altering said frequency of said high frequency pulse width modulated component from a first switching frequency to a second switching frequency further comprises altering said frequency of said high frequency pulse width modulated component to a third switching frequency when said rotation speed of said motor increases to a high rotation speed, and wherein said third switching frequency is higher than said second switching frequency.

6. The method of claim 5, further comprising suppressing a change to said third switching frequency when said high rotation speed is greater than a predetermined speed and said high rotation speed decreases by a relatively small amount.

7. The method of claim 1, wherein altering said frequency of said high frequency pulse width modulated component from a first switching frequency to a second switching frequency is dependant upon a torque requirement of said motor.

8. The method of claim 7, wherein said altering is determined by the equation:

$$f_2 = b - k * (T_{req} - T_{drt})$$
$$k = \frac{f_{max} - f_{min}}{T_{max} - T_{drt}}$$

wherein $f_2$=said second switching frequency; b=a linear offset frequency equal to a maximum switching frequency of said motor; $f_{max}$=a maximum switching frequency; $f_{min}$=a minimum switching frequency; $T_{max}$=a maximum torque requirement of said motor; $T_{req}$=a immediate torque requirement of said motor; and $T_{drt}$=a derated torque of said motor.

9. The method of claim 7, further comprising reducing said fundamental frequency of said voltage switching when said torque requirement at said motor is less than a maximum rated torque of said motor.

10. A controller for an electric motor, comprising:
    means for switching a voltage within power electronics at a first fundamental frequency to drive said motor
    means for providing a high frequency pulse width modulated component within said first fundamental frequency, said high frequency component having a frequency greater than said fundamental frequency;
    means for detecting a rotation speed of said motor; and,
    means responsive to said detecting means for altering said frequency of said high frequency pulse width modulated component from a first switching frequency to a second switching frequency to control efficiency in said power electronics, said altering means further comprising means for switching said high frequency component means to a third switching frequency when said rotation speed of said motor increases to a high rotation speed, wherein said third switching frequency is higher than said second switching frequency.

11. The controller of claim 10, wherein said means for detecting comprises:
    a sensor configured to locate a point on the rotor of said motor; and
    a timer configured to measure the time between a first time said sensor locates said point and a second time said sensor locates said point.

12. The controller of claim 11, wherein said sensor is a Hall effect sensor.

13. The controller of claim 10, further comprising a power supply configured to supply said voltage to said switching means, said power supply configured to supply said voltage at an amplitude to produce maximum torque in said motor.

14. The controller of claim 10, wherein said altering means further comprises means for linearly varying said first switching frequency to said second switching frequency.

15. The controller of claim 10, wherein said detecting means further comprises means for determining the required torque of said motor.

16. The controller of claim 15, wherein said altering means further comprises means for linearly varying said first switching frequency to said second switching frequency responsive to the required torque of said motor.

17. The controller of claim 15, further comprising a power supply configured to supply said voltage to said switching means and further configured to limit said voltage when said required torque of said motor is less than a maximum rated torque of said motor.

18. The controller of claim 10, wherein said altering means is further configured to suppress a change to said third switching frequency when said high rotation speed is greater than a predetermined speed and said high rotation speed decreases by a relatively small amount.

19. A method of generating a smooth, rated torque at a slow rotation speed of a motor, said motor including a rotor, comprising:
passing a first switched pulse width modulated voltage to power electronics driving said motor at a first switching frequency when said rotor is rotating at a rotation speed above said slow rotation speed;
passing a second switched pulse width modulated voltage to said power electronics at a second switching frequency when said rotor is rotating at a rotation speed at or below said slow rotation speed, said second switching frequency being less than said first switching frequency;
wherein a single specified torque of said motor is produced at both said first switching frequency and said second switching frequency; and
further comprising determining said second switching frequency as a linear relationship to said first switching frequency given by the equation, $$f_2 = k * v_{cur} + b$$

$$k = \frac{f_{max} - f_{min}}{v_{max} - v_{min}}$$

wherein $f_2$=said second switching frequency; $v_{cur}$=rotation speed of said rotor; b=a linear offset frequency equal to a minimum switching frequency; $f_{max}$=a maximum switching frequency; $f_{min}$=a minimum switching frequency; $v_{max}$=a maximum rotation speed for said rotor; and $v_{min}$=a minimum rotation speed of said rotor.

20. The method of claim 19, wherein said slow rotation speed is a stall condition.

21. The method of claim 19, wherein said first switching frequency is a switching frequency of 20 kHz and said second switching frequency is 5 kHz.

22. The method of claim 19, wherein said first switched voltage produces a maximum rated torque of the motor.

23. The method of claim 19, further comprising switching said current at a third switching frequency when said rotation speed of said rotor increases to a high rotation speed, wherein said third switching frequency is higher than second switching frequency.

24. The method of claim 23, wherein said high rotation speed is greater than said slow rotation speed such that a small change in rotation speed does not change the switching frequency.

25. The method of claim 19, further comprising determining said second switching frequency based on a torque requirement of said motor.

26. The method of claim 25, wherein said determining is defined by:

$$f_2 = b - k * (T_{req} - T_{drt})$$

$$k = \frac{f_{max} - f_{min}}{T_{max} - T_{drt}}$$

wherein $f_2$=said second switching frequency, b=a linear offset frequency equal to a maximum switching frequency of said motor; $f_{max}$=a maximum switching frequency; $f_{min}$=a minimum switching frequency; $T_{max}$=a maximum torque requirement of said motor; $T_{min}$=an immediate torque requirement of said motor; and $T_{drt}$=a derated torque of said motor.

27. The method of claim 25, wherein said voltage is derated when the torque requirement at said motor is less than the maximum rated torque of said motor.

28. A controller for an electric motor, comprising:
a switching converter configured to alter a drive signal to power electronics from a first pulse width modulated switching frequency to a second pulse width modulated switching frequency; and
a position sensor configured to detect a rotation speed of said motor,
wherein said switching converter switches said frequencies when said position sensor detects a rotation speed of said motor equivalent to a predetermined rotation speed, said switching converter being configured to alter said drive signal at a third switching frequency when said rotation speed of said motor increases to a predetermined fast rotation speed, said third switching frequency being higher than said second switching frequency.

29. The controller of claim 28, wherein said predetermined speed is at a stall condition.

30. The controller of claim 28, wherein said switching converter is configured to vary said switching frequencies according to a linear relationship between said second switching frequency and said first switching frequency.

31. The controller of claim 28, wherein said predetermined high rotation speed is greater than said predetermined speed such that a small drop in rotation speed at said predetermined high rotation speed does not change the switching frequency.

32. The controller of claim 28, wherein said position sensor is further configured to determine said second switching frequency based on a torque requirement of said motor.

33. The controller of claim 32, wherein current is derated when said torque requirement at said motor is less than a maximum rated torque of said motor.

34. The controller of claim 28, wherein said position sensor comprises a Hall effect sensor.

35. The controller of claim 28, wherein said position sensor determines the rotation speed by back-emf.

36. A method of controlling the efficiency of power electronics driving a motor, comprising:
switching a voltage within said power electronics at a first fundamental frequency;
providing a high frequency pulse width modulated component within said first fundamental frequency, said high frequency component have a frequency greater than said fundamental frequency;

detecting a rotation speed of said motor; and responsive to said rotation speed, altering said frequency of said high frequency pulse width modulated component from a first switching frequency to a second switching frequency to control efficiency in said power electronics, said altering said frequency of said high frequency pulse width modulated component from a first switching frequency to a second switching frequency further comprises altering said frequency of said high frequency pulse width modulated component to a third switching frequency when said rotation speed of said motor increases to a high rotation speed, and wherein said third switching frequency is higher than said second switching frequency.

37. The method of claim 36, wherein said altering said frequency of said high frequency pulse width modulated component from a first switching frequency to a second switching frequency comprises determining said second frequency by the equation:

$$f_2 = k * v_{cur} + b$$
$$k = \frac{f_{max} - f_{min}}{v_{maz} - v_{min}}$$

wherein $f_2$=said second switching frequency; $v_{cur}$=rotation speed of said motor b=a linear offset frequency equal to a minimum switching frequency; $f_{max}$=a maximum switching frequency; $f_{min}$=a minimum switching frequency; $v_{max}$=a maximum rotation speed for said motor; and $v_{min}$=a minimum rotation speed of said motor.

38. The method of claim 36, further comprising suppressing a change to said third switching frequency when said high rotation speed is greater than a predetermined speed and said high rotation speed decreases by a relatively small amount.

39. The method of claim 36, wherein altering said frequency of said high frequency pulse width modulated component from a first switching frequency to a second switching frequency is dependant upon a torque requirement of said motor.

40. The method of claim 39, wherein said altering is determined by the equation:

$$f_2 = b - k * (T_{req} - T_{drt})$$
$$k = \frac{f_{max} - f_{min}}{T_{max} - T_{drt}}$$

wherein $f_2$=said second switching frequency; b=a linear offset frequency equal to a maximum switching frequency of said motor; $f_{max}$=a maximum switching frequency; $f_{min}$=a minimum switching frequency; $T_{max}$=a maximum torque requirement of said motor; $T_{req}$=an immediate torque requirement of said motor; and $T_{drt}$=a derated torque of said motor.

41. The method of claim 39, further comprising reducing said fundamental frequency of said voltage switching when said torque requirement at said motor is less than said maximum rated torque of said motor.

42. A method of controlling the efficiency of power electronics driving a motor, comprising:

switching a voltage within said power electronics at a first fundamental frequency;

providing a high frequency pulse width modulated component within said first fundamental frequency, said high frequency component have a frequency greater than said fundamental frequency;

detecting a rotation speed of said motor; and responsive to said rotation speed, altering said frequency of said high frequency pulse width modulated component from a first switching frequency to a second switching frequency to control efficiency in said power electronics, said altering said frequency of said high frequency pulse width modulated component from a first switching frequency to a second switching frequency being dependant upon a torque requirement of said motor.

43. The method of claim 42, wherein said altering is determined by the equation:

$$f_2 = b - k * (T_{req} - T_{drt})$$
$$k = \frac{f_{max} - f_{min}}{T_{max} - T_{drt}}$$

wherein $f_2$=said second switching frequency; b=a linear offset frequency equal to a maximum switching frequency of said motor; $f_{max}$=a maximum switching frequency; $f_{min}$=a minimum switching frequency; $T_{max}$=a maximum torque requirement of said motor; $T_{req}$=an immediate torque requirement of said motor; and $T_{drt}$=a derated torque of said motor.

44. The method of claim 42, further comprising reducing said fundamental frequency of said voltage switching when said torque requirement at said motor is less than said maximum rated torque of said motor.

45. A method of generating a smooth, rated torque at a slow rotation speed of a motor, said motor including a rotor, comprising:

passing a first switched pulse width modulated voltage to power electronics driving said motor at a first switching frequency when said rotor is rotating at a rotation speed above said slow rotation speed;

passing a second switched pulse width modulated voltage to said power electronics at a second switching frequency when said rotor is rotating at a rotation speed at or below said slow rotation speed, said second switching frequency being less than said first switching frequency, a single specified torque of said motor being produced at both said first switching frequency and said second switching frequency; and switching said current at a third switching frequency when said rotation speed of said rotor increases to a high rotation speed, wherein said third switching frequency is higher than said second switching frequency.

46. The method according to claim 45, further comprising determining said second switching frequency as a linear relationship to said first switching frequency given by the equation, $$f_2 = k * v_{cur} + b$$
$$k = \frac{f_{max} - f_{min}}{v_{max} - v_{min}}$$

wherein $f_2$=said second switching frequency; $v_{cur}$=rotation speed of said rotor;

b=a linear offset frequency equal to a minimum switching frequency; $f_{max}$=a maximum switching frequency;

$f_{min}$=a minimum switching frequency; $v_{max}$=a maximum rotation speed for said rotor; and $v_{min}$=a minimum rotation speed of said rotor.

47. The method according to claim 45, wherein said high rotation speed is greater than said slow rotation speed such that a small change in rotation speed does not change the switching frequency.

48. The method according to claim 45, further comprising determining said second switching frequency based on the torque requirement of said motor, said determining being defined by:

$$f_2 = b - k*(T_{req} - T_{drt})$$
$$k = \frac{f_{max} - f_{min}}{T_{max} - T_{drt}}$$

wherein $f_2$=said second switching frequency, b=a linear offset frequency equal to a maximum switching frequency of said motor; $f_{max}$=a maximum switching frequency; $f_{min}$=a minimum switching frequency; $T_{max}$=a maximum torque requirement of said motor; $T_{min}$=an immediate torque requirement of said motor; and $T_{drt}$=a derated torque of said motor.

49. The method according to claim 48, wherein said voltage being derated when the torque requirement at said motor is less than a maximum rated torque of said motor.

50. A controller for an electric motor, comprising:
a switching converter configured to alter a drive signal to power electronics from a first pulse width modulated switching frequency to a second pulse width modulated switching frequency; and
a position sensor configured to detect a rotation speed of said motor, said switching converter switches said frequencies when said position sensor detects a rotation speed of said motor equivalent to a predetermined rotation speed, said position sensor further being configured to determine said second switching frequency based on a torque requirement of said motor, said current is derated when said torque requirement at said motor is less than a maximum rated torque of said motor.

* * * * *